(12) United States Patent
Kanemitsu

(10) Patent No.: US 8,078,991 B2
(45) Date of Patent: Dec. 13, 2011

(54) ELECTRIC APPLIANCE, IMAGE DISPLAY CONTROLLING METHOD, AND COMPUTER-CONTROLLED READABLE RECORDING MEDIUM STORING IMAGE DISPLAY CONTROLLING PROGRAM

(75) Inventor: Shigenaka Kanemitsu, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 504 days.

(21) Appl. No.: 12/246,534

(22) Filed: Oct. 7, 2008

(65) Prior Publication Data

US 2009/0113341 A1 Apr. 30, 2009

(30) Foreign Application Priority Data

Oct. 31, 2007 (JP) ................................. 2007-282995

(51) Int. Cl.
*G06F 3/048* (2006.01)
(52) U.S. Cl. .................. 715/806; 715/204; 715/240
(58) Field of Classification Search .................. 715/806, 715/204, 240
See application file for complete search history.

(56) References Cited

U.S. PATENT DOCUMENTS

| | | | | |
|---|---|---|---|---|
| 6,031,989 A | * | 2/2000 | Cordell | 717/109 |
| 6,657,647 B1 | * | 12/2003 | Bright | 715/856 |
| 6,711,714 B1 | * | 3/2004 | Wynblatt et al. | 715/209 |
| 7,933,447 B2 | * | 4/2011 | Yamazaki | 382/173 |
| 2006/0288278 A1 | * | 12/2006 | Kobayashi | 715/523 |
| 2006/0291478 A1 | * | 12/2006 | Cutler et al. | 370/395.52 |
| 2007/0003139 A1 | * | 1/2007 | Gotoh et al. | 382/173 |
| 2008/0046813 A1 | * | 2/2008 | Doatmas et al. | 715/240 |
| 2009/0116752 A1 | * | 5/2009 | Isomura et al. | 382/217 |

FOREIGN PATENT DOCUMENTS

| | | | |
|---|---|---|---|
| JP | 2000-222320 A | | 8/2000 |
| JP | 2005210689 | * | 8/2005 |

* cited by examiner

*Primary Examiner* — Steven Sax
*Assistant Examiner* — Linh K Pham
(74) *Attorney, Agent, or Firm* — Fitch, Even, Tabin & Flannery

(57) ABSTRACT

An electric appliance according to an embodiment of the present comprises a graphical image generation unit generates a graphical image from frame data and pane images generated by a pane image generation unit, and allows the display unit to display the graphical image. A frame data storage unit stores the frame data used for the display on the display unit. A pane image storage unit stores the pane images used for the display on the display unit. When frame data to be used for subsequent display on the display unit is acquired, a display control unit compares this frame data with the frame data stored in the frame data storage unit to select one of pane data to be acquired from a data storage unit and pane images to be acquired by the graphical image generation unit from the pane image storage unit.

4 Claims, 16 Drawing Sheets

Fig. 7 frame01

```
<frameset rows="30%,70%">
  <frame src="main" name="mainFrame" >
  <frameset cols="20%,80%">
    <frame src="submenu" name="bottomleftFrame">
    <frame src="content" name="bottomrightFrame">
  </frameset>
</frameset>
```
~50

Fig. 8 frame02

```
<frameset rows="30%, 70%">
  <frame src="main" name="mainFrame">
  <frameset cols="20%,80%">
    <frame src="submenu" name="bottomleftsideFrame">
    <frameset rows="60%,40%">
      <frame src="upperpane" name="rightUpperFrame">
      <frame src="bottompane" name="rightButtomFrame">
    </frameset>
  </frameset>
</frameset>
```
— 55a

Fig. 9

```
<head>
............
</head>
<body>
............
</body>
```
— 60

Fig. 10

| Unique identification value | Original source name | Storage time |
|---|---|---|
| 0x3c2d | main | ... |
| 0x09c8 | submenu | ... |
| 0x68da | content | ... |
| | | |
| | | |

~171

Fig. 13 frame01

```
<frameset rows="30%,70%">
  <frame src="hash/0x3c2d" name="mainFrame" >
   <frameset cols="20%,80%">
    <frame src="hash/0x09c8" name="bottomleftFrame">
    <frame src="hash/0x68da" name="bottomrightFrame">
  </frameset>
</frameset>
```
—50a

Fig. 14 frame02

```
<frameset rows="30%,70%">
  <frame src="hash/0x3c2d" name="mainFrame" >
   <frameset cols="20%,80%">
    <frame src="hash/0x09c8" name="bottomleftsideFrame">
    <frameset rows="60%,40%">
      <frame src="hash/0x114a" name="rightUpperFrame">
      <frame src="hash/0x9b62" name="rightButtomFrame">
    </frameset>
  </frameset>
</frameset>
```
—55a

Fig. 15 frame02

```
<frameset rows="30%, 70%">
 <frame src="hash/0x3c2d" name="mainFrame">
 <frameset cols="20%,80%">
  <frame src="hash/0x09c8" name="bottomleftsideFrame">
  <frameset rows="60%,40%">
   <frame src="upperpane" name="rightUpperFrame">
   <frame src="bottompane" name="rightButtomFrame">
  </frameset>
 </frameset>
</frameset>
```
— 55b

COMPUTER-READING RECODING MEDIUM

- IMAGE DISPLAY RECORDING PROGRAM

ELECTRIC APPLIANCE, IMAGE DISPLAY CONTROLLING METHOD, AND COMPUTER-CONTROLLED READABLE RECORDING MEDIUM STORING IMAGE DISPLAY CONTROLLING PROGRAM

INCORPORATION BY REFERENCE

This application is based upon and claims the benefit of priority from the corresponding Japanese Patent Application No. 2007-282995, filed Oct. 31, 2007, the entire contents of which is incorporated herein by reference.

BACKGROUND OF THE INVENTION

1. Field of the Invention

The present invention relates to an electric appliance that includes a display unit such as a display panel for displaying an image. The present invention also relates to an image display controlling method for controlling display of an image on the display unit of the electric appliance. The present invention also relates to a computer-readable recording medium that stores an graphical image display controlling program.

2. Description of the Related Art

Typically, an electric appliance such as a printer, a copying machine or an MFP (Multi Function Peripheral) includes an arithmetic processing part such as a CPU. The arithmetic processing part reads data for display such as an HTML document to generate a graphical image, and then allows a display panel or the like to display the image.

The display panel allows so-called frame display in which plurality of areas (panes) are partitioned by frames.

The display panel is provided with buttons for switching screens. With touch of the buttons, a user performs various operations, for example, changes a magnification upon creation of a printout, and selects a size of a sheet of paper upon creation of the printout.

The display on the display panel is controlled by an arithmetic processing part such as a microprocessor of the electric appliance.

The arithmetic processing part includes a memory, a Central Processing Unit (CPU), and the like. Herein, the memory stores, in advance, frame data for forming frames and pane data for forming pane images to be displayed on panes. The CPU processes the frame data and the pane data, and then allows the display panel to display a graphical image.

The CPU acquires frame data to form frames based on the frame data, acquires pane data specified by the frame data to generate pane images from the acquired pane data, and arranges the pane images in the frames to generate a graphical image. Thereafter, the CPU allows the display panel to display the graphical image.

Conventionally, there has been proposed a server/client system as one example of a technique of realizing the frame display on the display panel.

The server/client system is a business system for managing acceptance of orders, and includes a World Wide Web (WWW) server, a client Personal Computer (PC) and a database server.

As described above, the client PC establishes sessions with the database server without executing processes for establishing, maintaining and shutting down the sessions with the database server on the basis of the programs downloaded to the lower pane.

In the server/client system described above, moreover, when a graphical image composed of frames, which has been originally displayed on the display panel, is switched to a graphical image composed of subsequent frames, the arithmetic processing part acquires frame data of the subsequent frames. Further, the arithmetic processing part newly reads pane data specified by the frame data to generate a graphical image. Herein, the arithmetic processing part reads pane data specified by the frame data of the graphical image displayed originally and pane data specified by frame data of the graphical image to be displayed subsequently, in an overlapping manner. In such a case, conventionally, the client PC processes all pieces of pane data to generate pane images, and then arranges the pane images in a graphical image.

SUMMARY OF THE INVENTION

According to one aspect of the present invention, there is provided an electric appliance. The electric appliance comprises a display unit, a data storage unit, a frame data acquisition unit, a pane data acquisition unit, a pane image generation unit, a graphical image generation unit, a frame data storage unit, a pane image storage unit and a display control unit. The display unit allows frame display; a data storage unit that stores frame data for forming frames and pane data for generating pane images to be displayed in the frames. The frame data acquisition unit acquires frame data from the data storage unit. The pane data acquisition unit acquires, from the data storage unit, pane data specified by specific information of the frame data acquired by the frame data acquisition unit. The pane image generation unit generates pane images from the pane data acquired by the pane data acquisition unit. The graphical image generation unit forms frames based on the frame data acquired by the frame data acquisition unit, arranges the pane images generated by the pane image generation unit in the frames, generates a graphical image thereby, and allows the display unit to display the graphical image. The frame data storage unit stores the frame data used for the display on the display unit. The pane image storage unit stores the pane images used for the display on the display unit. And the display control unit, when the frame data acquisition unit acquires frame data to be used for subsequent display on the display unit, compares the frame data acquired by the frame data acquisition unit with the frame data stored in the frame data storage unit to select one of pane data to be acquired by the pane data acquisition unit and pane images to be acquired by the graphical image generation unit from the pane image storage unit.

According to another aspect of the present invention, there is provided a image display controlling method of an electric appliance. The display controlling method includes the steps of: (a) acquiring frame data from a data storage unit of the electric appliance, the data storage unit being configured to store frame data for forming frames and pane data for generating pane images to be displayed in the frames; (b) acquiring pane data specified by specific information of the acquired frame data, from the data storage unit; (c) generating pane images from the acquired pane data; forming frames based on the acquired frame data, arranging the generated pane images in the formed frames to generate a graphical image, and allowing a display unit to display the generated graphical image; (d) when acquiring, from the data storage unit, frame data to be used for subsequent display on the display unit, comparing the frame data to be used for subsequent display with the frame data used for the display on the display unit to select and acquire one of pane data to be used for subsequent display and the pane images used for the display on the display unit; and (e) generating a graphical image from the frame data and the selected one of the pane data and the pane images each acquired newly to allow the display unit to display the graphical image.

According to still another aspect of the present invention, there is provided a computer-readable recording medium for storing an image display controlling program. The image display controlling program allows a computer of an electric appliance to function as a display unit, a data storage unit, a frame data acquisition unit, a pane data acquisition unit, a pane image generation unit, a graphical image generation unit, a frame data storage unit, a pane image storage unit and a display control unit. The display unit allows frame display. The data storage unit stores frame data for forming frames and pane data for generating pane images to be displayed in the frames. The frame data acquisition unit acquires frame data from the data storage unit. The pane data acquisition unit acquires, from the data storage unit, pane data specified by specific information of the frame data acquired by the frame data acquisition unit. The pane image generation unit generates pane images from the pane data acquired by the pane data acquisition unit. The graphical image generation unit that forms frames based on the frame data acquired by the frame data acquisition unit, arranges the pane images generated by the pane image generation unit in the frames, generates a graphical image thereby, and allows the display unit to display a graphical image. The frame data storage unit stores the frame data used for the display on the display unit. The pane image storage unit stores the pane images used for the display on the display unit. And the display control unit, when the frame data acquisition unit acquires frame data to be used for subsequent display on the display unit, compares the frame data acquired by the frame data acquisition unit with the frame data stored in the frame data storage unit to select one of pane data to be acquired by the pane data acquisition unit and pane images to be acquired by the graphical image generation unit from the pane image storage unit.

According to yet another aspect of the present invention, an electric appliance comprises a display, a first memory, a second memory, a display control unit. The display is configured to display graphical images that are based upon frame data and pane images. The first memory has used frame data stored therein. The second memory has used pane images stored therein. The display control unit is operably coupled to the display, the first memory, and the second memory and is configured to compare subsequent frame data with the used frame data in order to automatically select between using: pane data is specified by specific information contained within the subsequent frame data; and the used pane images; when preparing a subsequent graphical image to display on the display.

These and other objects, features and advantages of the present invention will become more apparent from the following detailed description of the present invention when taken in conjunction with the accompanying drawings.

Skilled artisans will appreciate that well-understood elements that are useful or necessary in a commercially feasible embodiment are not necessarily depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

BRIEF DESCRIPTION OF THE DRAWINGS

FIG. 7 shows one example of frame data for use in the electric appliance according to the embodiment of the present invention;

FIG. 8 shows another example of frame data for use in the electric appliance according to the embodiment of the present invention;

FIG. 9 shows one example of pane data for use in the electric appliance according to the embodiment of the present invention;

FIG. 10 shows a management table for use in the electric appliance according to the embodiment of the present invention;

FIG. 13 shows one example of frame data restructured by a frame restructuring part in the electric appliance according to the embodiment of the present invention;

FIG. 14 shows another example of frame data restructured by the frame restructuring part in the electric appliance according to the embodiment of the present invention;

FIG. 15 shows still another example of frame data outputted from the frame restructuring part to a frame analyzing part in the electric appliance according to the embodiment of the present invention; and FIG. 16 shows a computer-readable recording medium-based embodiment of the invention.

DESCRIPTION OF THE PREFERRED EMBODIMENTS

Hereinafter, description will be given of an electric appliance, an image display controlling method and an image display controlling program according to preferred embodiments of the present invention. It is to be noted that the image display controlling method is described as comprising a portion of the functionality of the electric appliance.

Figure 1:
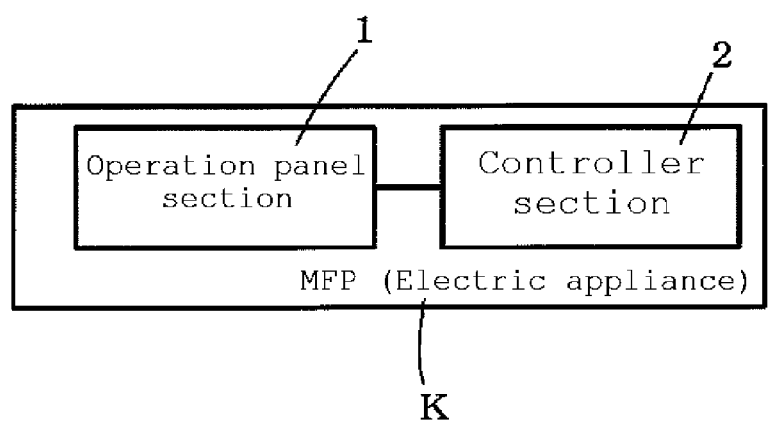
FIG. 1 schematically shows a configuration of an electric appliance according to one embodiment of the present invention.
Figure 2:
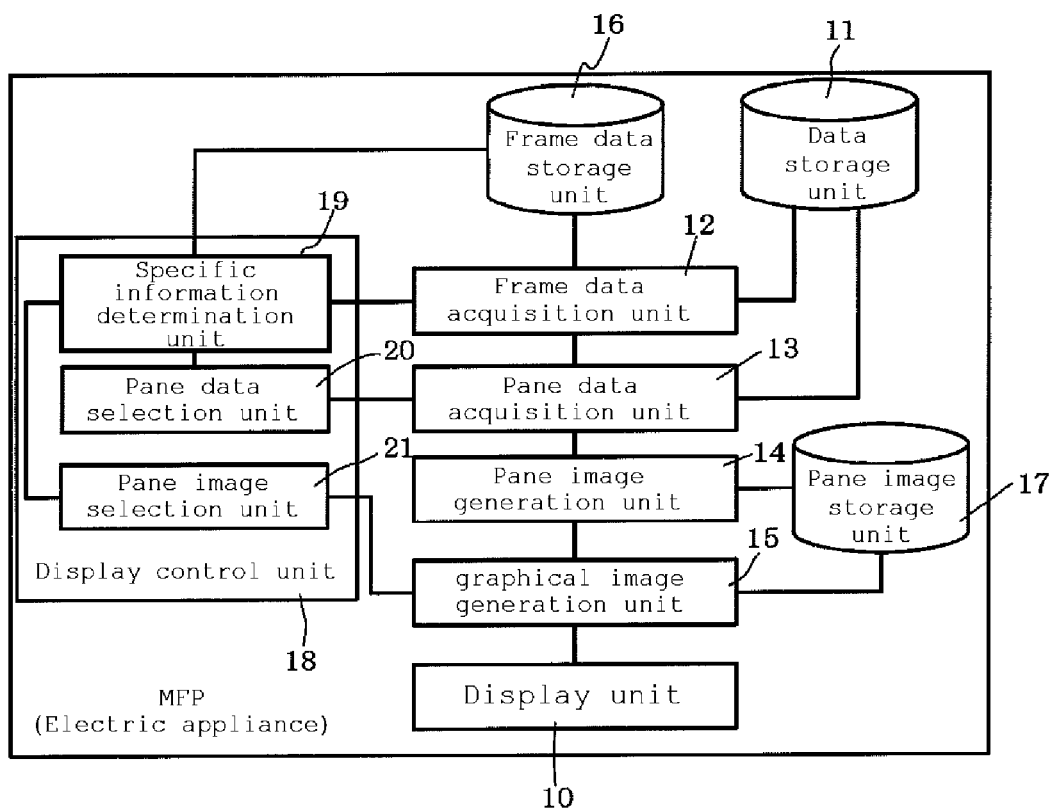
FIG. 2 shows a functional block diagram of the electric appliance according to the embodiment of the present invention.
Figure 3:
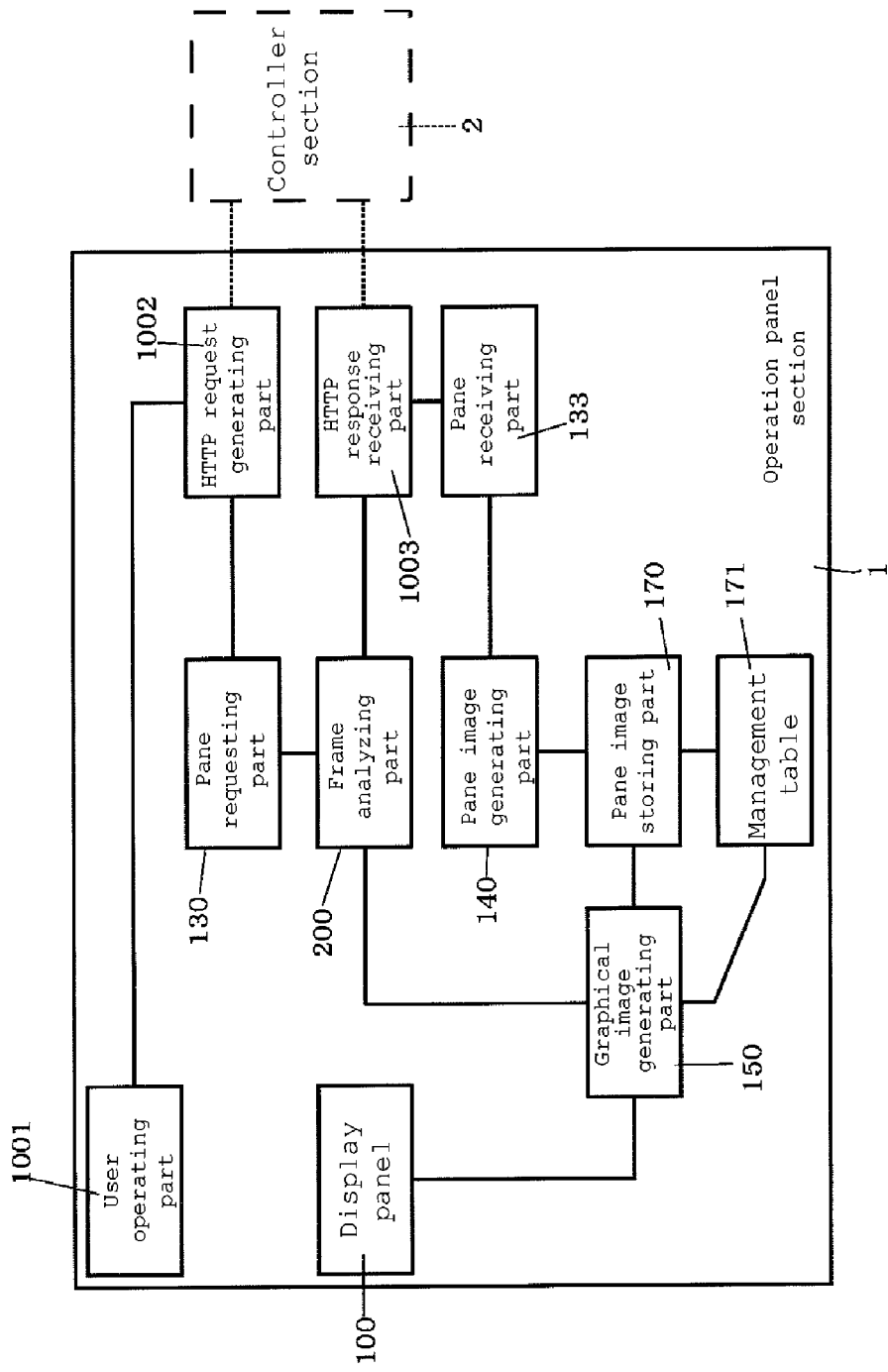
FIG. 3 schematically shows a configuration of an operation panel section in the electric appliance according to the embodiment of the present invention.

Referring now to FIGS. 1, 2, and 3, the electric appliance K is, for example, an MFP that includes a display unit 10 allowing frame display.

Figure 5A:
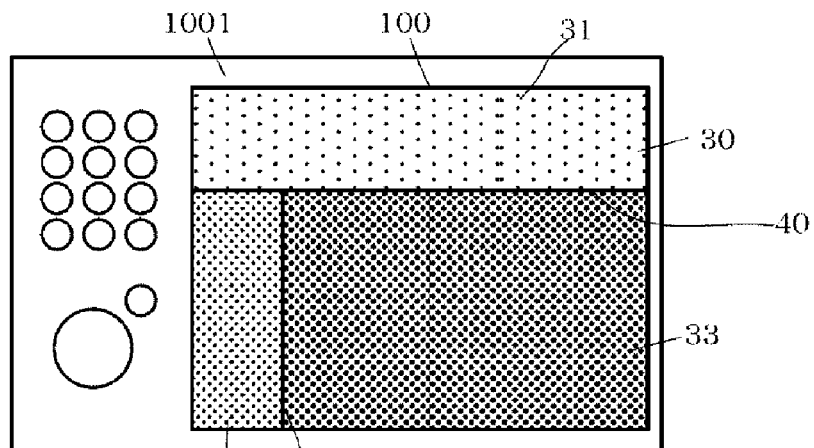
FIG. 5A shows a user operating part and a display panel in the electric appliance according to the embodiment of the present invention in a state where a graphical image is displayed on the display panel.
Figure 5B:
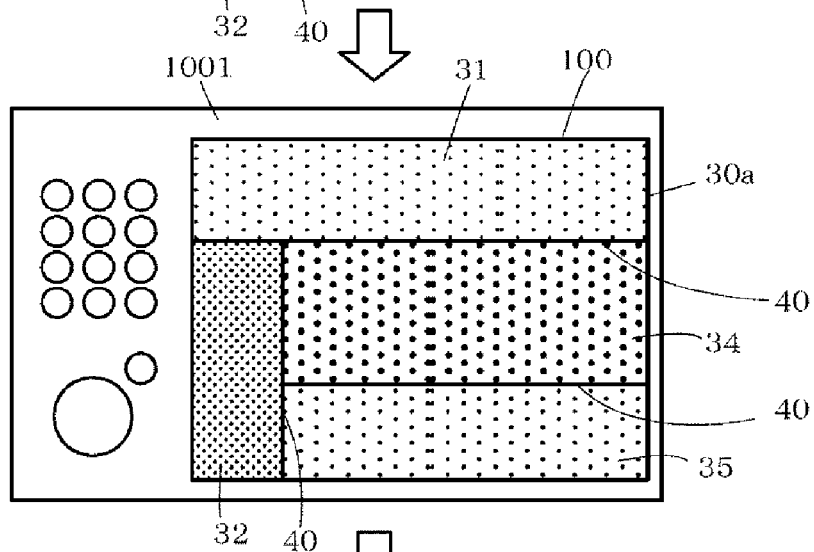
FIG. 5B shows the user operating part and the display panel in the electric appliance according to the embodiment of the present invention in a state where another graphical image is displayed on the display panel.
Figure 5C:
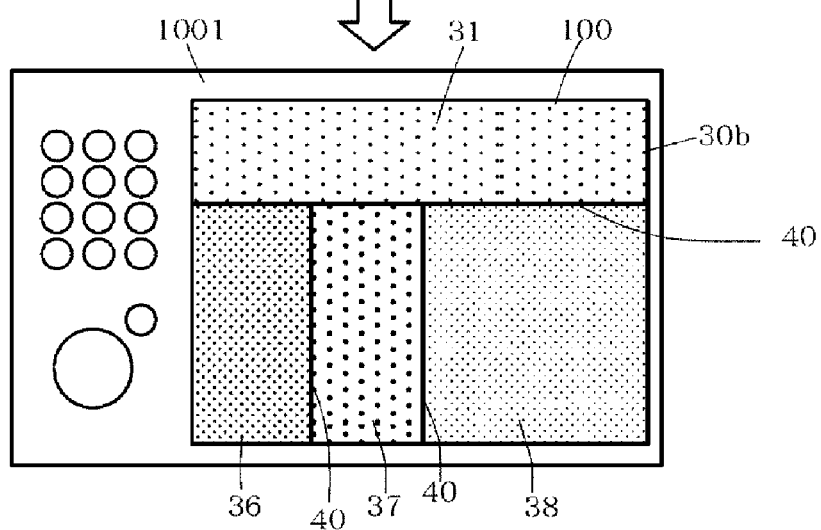
FIG. 5C shows the user operating part and the display panel in the electric appliance according to the embodiment of the present invention in a state where still another graphical image is displayed on the display panel.

The display unit 10 includes a display panel 100 such as a liquid crystal panel. As shown in FIGS. 5A to 5C, for example, the display panel 100 displays one of graphical images 30, 30a and 30b. Each of the graphical images 30, 30a and 30b is composed of one or more frames 40 and some of panes 31 to 38 defined by the frames 40.

Herein, the panes indicate at least two areas partitioned by the frames 40 (i.e., the portions 31 to 38 shown by different dot patterns in FIGS. 5A to 5C) in the display panel 100.

The display panel 100 is a so-called touch panel through which a user performs predetermined settings and operations with touch of graphical buttons displayed thereon.

As shown in FIG. 2, the electric appliance K includes a data storage unit 11, a frame data acquisition unit 12, a pane data acquisition unit 13, a pane image generation unit 14, a graphical image generation unit 15, a frame data storage unit 16 and a pane image storage unit 17. The data storage unit 11 stores frame data for forming frames 40, and pane data for forming pane images to be displayed in the frames 40. The frame data acquisition unit 12 acquires frame data from the data storage unit 11. The pane data acquisition unit 13 acquires, from the data storage unit 11, pane data specified by specific information of the frame data acquired by the frame data acquisition unit 12. The pane image generation unit 14 generates pane images from the pane data acquired by the pane data acquisition unit 13. The graphical image generation unit 15 forms frames 40 based on the frame data acquired by the frame data acquisition unit 12, arranges the pane images generated by the pane image generation unit 14 in the frames 40 to generate a graphical image, and allows the display unit 10 to display the graphical image. The frame data storage unit 16 stores the frame data used for the display on the display unit 10. The pane image storage unit 17 stores the pane images used for the display on the display unit 10. By one approach, these units can store their respective information for only a predetermined amount of time or for a predetermined number of frame cycles or the like. By another approach, this storage can persist until, for example, the storage media becomes filled (at which time, for example, the oldest content can be deleted to make room for new content) or until some other triggering event of choice occurs.

Specifically, the electric appliance K includes an operation panel section 1 and a controller section 2. The operation panel section 1 includes the display panel 100 and a user operating part 1001 operated by the user. The controller section 2 is connected to the operation panel section 1 through an internal bus 3.

Each of the operation panel section 1 and the controller section 2 includes one or more CPU's (such as a microprocessor or a microcontroller), one or more memories (such as a Read Only Memory (ROM)) and the like (not shown), and is actuated in such a manner that the CPU and the memory execute a JAVA (registered trademark) program stored in the ROM. The functionality of this JAVA program can comprise any one or more of the steps, actions, and functionality that is presented herein.

The operation panel section 1 interprets data described in an HTML (Hyper Text Markup Language) format to perform display of a graphical image on the display panel 100 (so-called rendering).

Communications between the operation panel section 1 and the controller section 2 are established using HTTP (Hyper Text Transfer Protocol).

Figure 4:
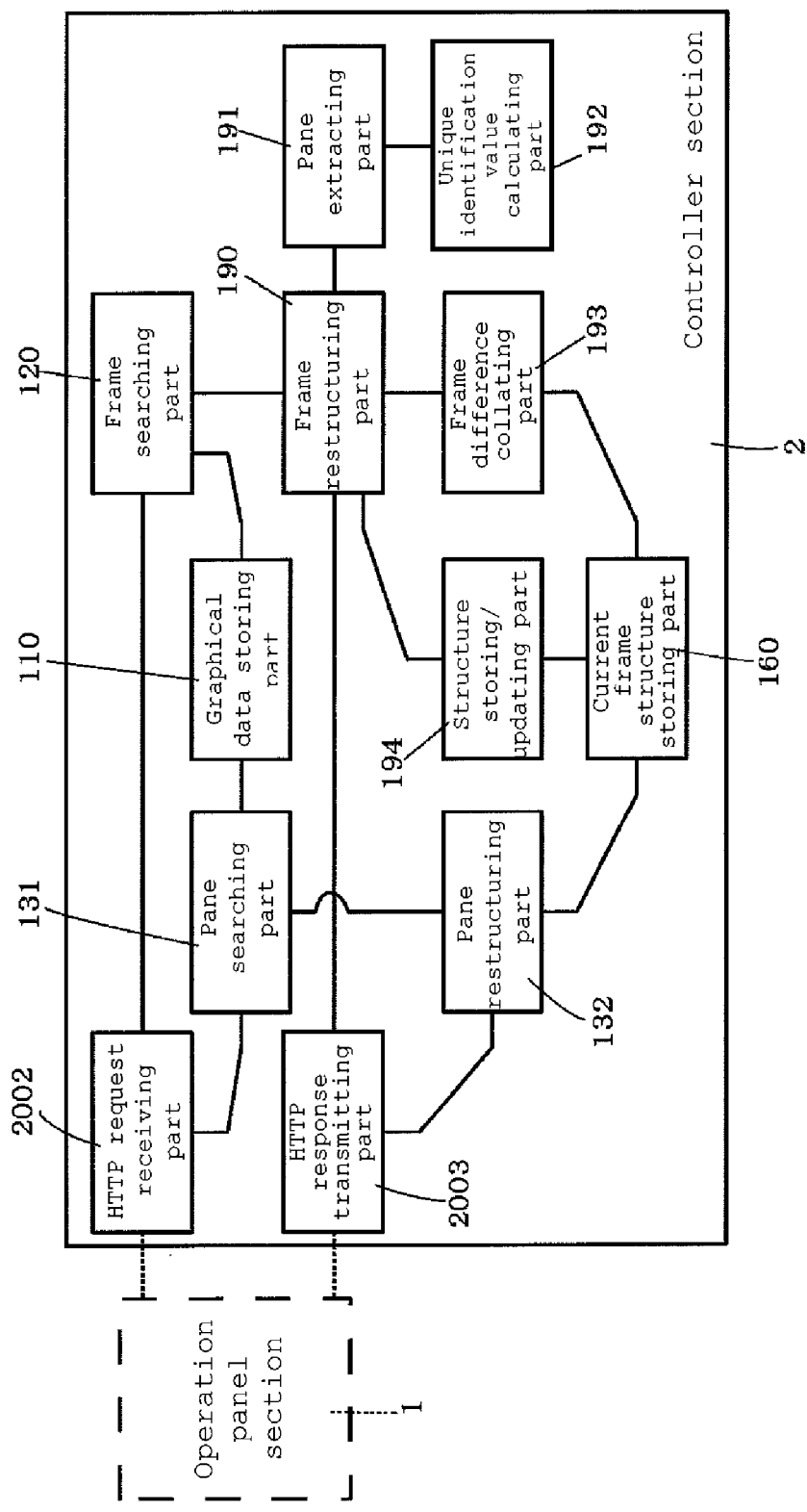
FIG. 4 schematically shows a configuration of a controller section in the electric appliance according to the embodiment of the present invention.

For example, and referring now momentarily to FIG. 4, this communication can be performed through an HTTP request generating part 1002 of the operation panel section 1, an HTTP request receiving part 2002 of the controller section 2, an HTTP response transmitting part 2003 of the controller section 2, and an HTTP response receiving part 1003 of the operation panel section 1.

The data storage unit 11 is realized by an image data storing part (also referred to herein as a graphical data storing part) 110 of the controller section 2. The image data storing part 110 includes a memory device such as a flash memory or a hard disk drive.

Figure 6:
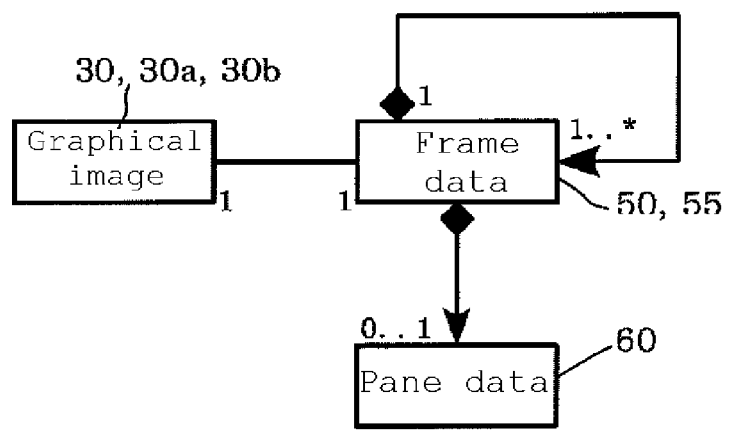
FIG. 6 shows a relation among a graphical image to be displayed, frame data and pane data in the electric appliance according to the embodiment of the present invention.

FIG. 6 shows a relation among graphical images (30, 30a, 30b) to be displayed on the display panel 100, frame data (50, 55) and pane data (60) that are each stored in the image data storing part 110.

The frame data (50, 55) forms the graphical image (30, 30a, 30b) to be displayed on the display panel 100. The pane data (60) is structured such that it can be nested within the frame data (50, 55). Herein, the frame data (50, 55) may be arranged in frames formed from another frame data (50, 55).

The image data storing part 110 stores the frame data 50 with a source name "frame01" (see FIG. 7) and the frame data 55a with a source name "frame02" (see FIG. 8).

Each of the frame data 50 and the frame data 55 is described in an HTML format. Moreover, each of the frame data 50 and the frame data 55 has specific information for specifying pane data of pane images to be displayed in frames 40. The specific information contains position information such as a Uniform Resource Identifier (URI) including a Uniform Resource Locator (URL) or a path. In this embodiment, the specific information contains a path in a memory device. Specifically, the specific information is described as a value "src" of an element of a frame tag <frame>.

The image data storing part 110 stores pane data 60 with a source name "main", pane data 60 with a source name "submenu", pane data 60 with a source name "content", pane data 60 with a source name "upperpane" and pane data 60 with a source name "bottompane".

Figure 9:
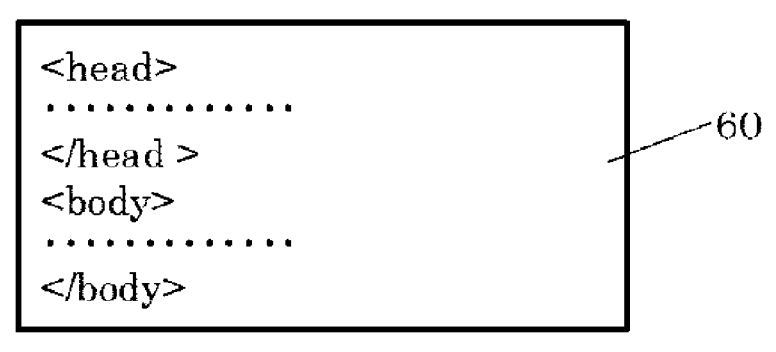

As shown in FIG. 9, the pane data 60 is also described in an HTML format. In the FIG. 9, a head tag (<head> . . . </head>) defines properties (ex. font size, font color, background color) of the pane image corresponding to the pane data 60. A body tag (<body> . . . </body>) defines data (ex. text data, link destination of image object) configured the pane image corresponding to the pane data 60.

The frame data acquisition unit 12 is realized by a frame searching part 120 of the controller section 2.

When the user operates the user operating part 1001, the frame searching part 120 searches for the frame data 50 and the frame data 55 stored in the image data storing part 110.

The pane data acquisition unit 13 is realized by a pane requesting part 130 of the operation panel section 1, a pane searching part 131 of the controller section 2, a pane restructuring part 132 of the controller section 2, and a pane receiving part 133 of the operation panel section 1.

The pane requesting part 130 allows the pane searching part 131 to search for the pane data 60 specified by the frame data 50 and the pane data 60 specified by the frame data 55.

The pane searching part 131 searches for the pane data 60 stored in the image data storing part 110, and then transfers the pane data 60 to the pane restructuring part 132.

The pane restructuring part 132 acquires a unique identification value of the pane data 60 from a current frame structure storing part 160 (to be described later). Then, the pane restructuring part 132 adds the unique identification value to a header of the pane data 60, and sends the resultant pane data 60 to the operation panel section 1.

The pane receiving part 133 receives the pane data 60.

The pane image generation unit 14 is realized by a pane image generating part 140.

The pane image generating part 140 generates pane images, and allows a pane image storing part 170 serving as the pane image storage unit 17 to store the pane images. The pane image storing part 170 includes a memory device such as a flash memory or a hard disk drive.

In addition, the pane image generating part 140 creates a management table 171 for the pane images stored in the pane image storing part 170.

As shown in FIG. 10, the management table 171 shows a unique identification value used for identification of a pane image, a name of source pane data contained in specific information of frame data, and a storage time which is a precise time stamp or a precise systematic value.

The graphical image generation unit 15 is realized by a graphical image generating part 150.

The graphical image generating part 150 forms frames 40 based on frame data sent from the controller section 2. Then, the graphical image generating part 150 reads pane images stored in the pane image storing part 170 on the basis of specific information of the frame data, and arranges the pane images in predetermined panes 31 to 38 defined by the frames 40. Thus, the graphical image generating part 150 generates a graphical image.

Moreover, the graphical image generating part 150 allows the display panel 100 to display the graphical image.

Herein, the graphical image generating part 150 has a cache function of storing a cache of frame data with specific information thereof being rewritten to a unique identification value. Again, the duration of this storage can vary as desired to accommodate the needs and/or capabilities of a given application setting.

With this configuration, the graphical image generating part 150 can read pane images with the use of frame data of a cache, leading to acceleration of file search of the pane images.

Thus, the display panel 100 uses the cache to display a graphical image displayed previously, leading to improvement of response upon display of the graphical image on the display panel 100.

The electric appliance K also includes a display control unit 18. When the frame data acquisition unit 12 acquires frame data for use in subsequent display on the display unit 10, the display control unit 18 compares the frame data acquired by the frame data acquisition unit 12 with the frame data stored in the frame data storage unit 16 to select pane data to be acquired by the pane data acquisition unit 13 and to select pane images to be acquired by the graphical image generation unit 15 from the pane image storage unit 17.

The display control unit 18 includes a specific information determination unit 19, a pane data selection unit 20 and a pane image selection unit 21. The specific information determination unit 19 determines whether specific information of the frame data for use in the subsequent display, acquired by the frame data acquisition unit 12, is equal to the specific information of the frame data stored in the frame data storage unit 16. The pane data selection unit 20 allows the pane data acquisition unit 13 to acquire pane data corresponding to the specific information of the frame data for use in the subsequent display when the specific information determination unit 19 determines that the two pieces of specific information are different each other. The pane image selection unit 21 allows the graphical image generation unit 15 to acquire, from the pane image storage unit 17, pane images of pane data corresponding to the specific information of the frame data stored in the frame data storage unit 16 when the specific information determination unit 19 determines that the two pieces of specific information are equal each other. (By one approach, the expression "equal" will be understood to refer to an exact similarity in all regards between the items of information that are being compared. By another approach, however, those skilled in the art will recognize that something less than an exact equality will suffice for some application settings. In such a case, it may be useful to implement instead a standard requiring substantial equality as between the two items of information. As one simple example in this regard, it may be sufficient if the two items are 99% equal to one another.

The display control unit 18 also includes a unique identification value calculation unit that calculates a unique identification value of specific information.

The specific information determination unit 19 includes an identifier addition unit that adds a predetermined identifier to the specific information on the basis of the determination by the specific information determination unit 19.

The specific information determination unit 19 is realized by a frame restructuring part 190, a pane extracting part 191, a unique identification value calculating part 192 serving as the unique identification value calculation unit and a frame difference collating part 193 of the controller section 2.

The frame restructuring part 190 outputs the frame data acquired by the frame searching part 120 to the pane extracting part 191. The pane extracting part 191 extracts specific information from the frame data. The unique identification value calculating part 192 calculates a unique identification value of the extracted specific information.

The unique identification value calculating part 192 calculates a hash value as the unique identification value of the specific information with the use of a hash function. A hash function is any well-defined procedure for turning some kind of data into a relatively small integer (which is then often used as an index into a corresponding array). The values returned by a hash function are called hash values, hash codes, hash sums, or simply hashes The frame restructuring part 190 outputs, to the frame difference collating part 193, the frame data together with the unique identification value calculated by the unique identification value calculating part 192.

The frame difference collating part 193 collates the frame data stored in the current frame structure storing part 160 with the frame data outputted from the frame restructuring part 190.

Moreover, the frame restructuring part 190 rewrites the specific information (the value "src") of the frame data for use in the subsequent display determined equal to the specific information of the frame data stored in the frame data storage unit 16 as follows: "hash/[the unique identification value]". And then the frame restructuring part 190 outputs the resultant frame data to the operation panel section 1.

After the collation by the frame difference collating part 193, further, a structure storing/updating part 194 updates the frame data from the frame restructuring part 190 as frame data to be stored in the current frame structure storing part 160.

The pane data selection unit 20 and the pane image selection unit 21 are realized by a frame analyzing part 200.

The frame analyzing part 200 analyzes the frame data sent from the frame restructuring part 190.

The frame analyzing part 200 allows the pane requesting part 130 to issue a request to acquire pane data on the basis of presence/absence of an identifier added to the specific information contained in the frame data, and then allows the graphical image generating part 150 to acquire the pane images.

With regard to specific information containing no identifier "hash/", more specifically, the frame analyzing part 200 allows the pane requesting part 130 to issue a request to acquire pane data corresponding to the specific information. With regard to specific information containing an identifier "hash/", on the other hand, the frame analyzing part 200 allows the graphical image generating part 150 to acquire existing pane images stored in the pane image storing part 170 without allowing the pane requesting part 130 to issues a request to acquire pane data corresponding to the specific information.

Figure 11:
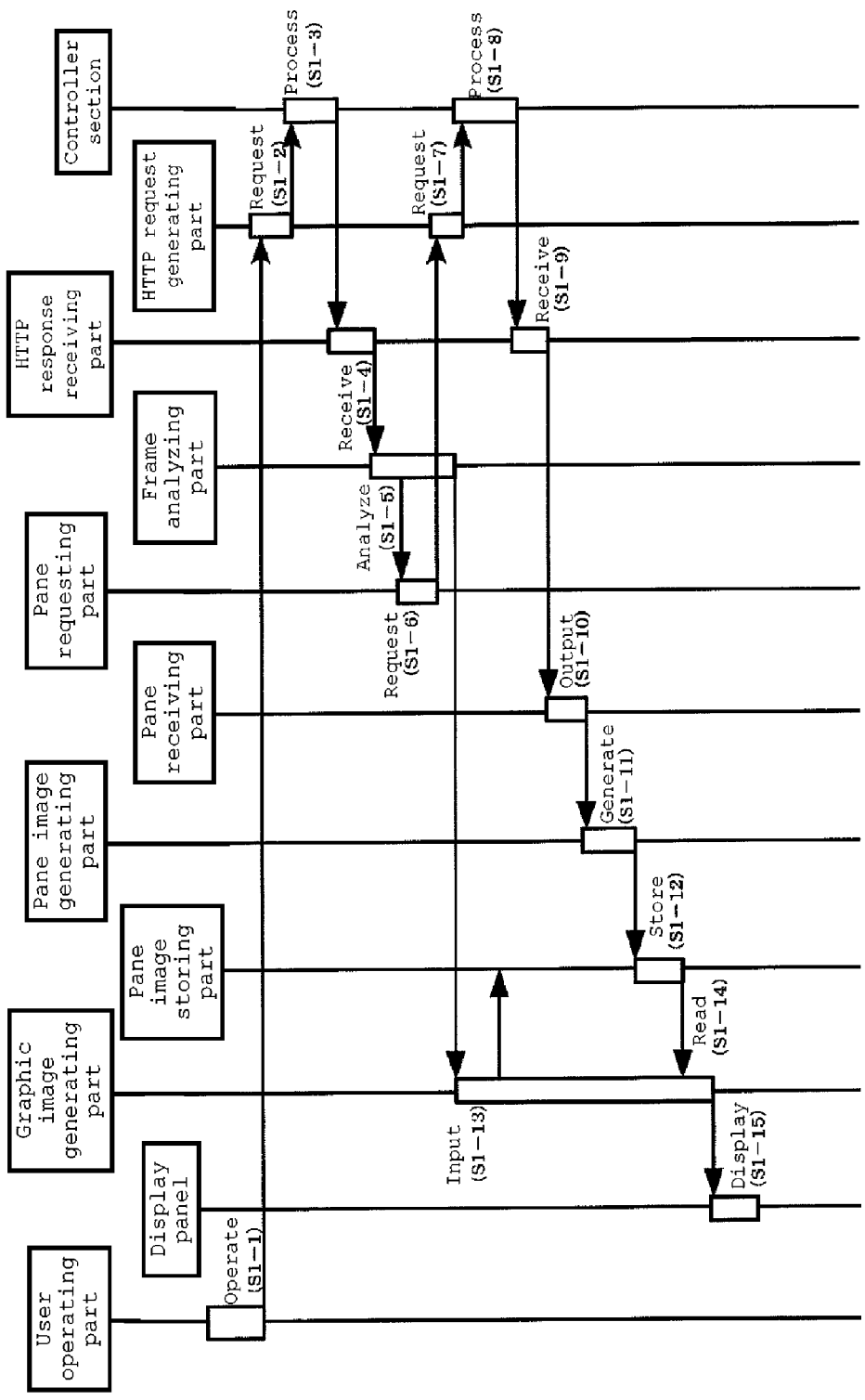
FIG. 11 shows a sequence of operations performed on a side of the operation panel section in the electric appliance according to the embodiment of the present invention.
Figure 12:
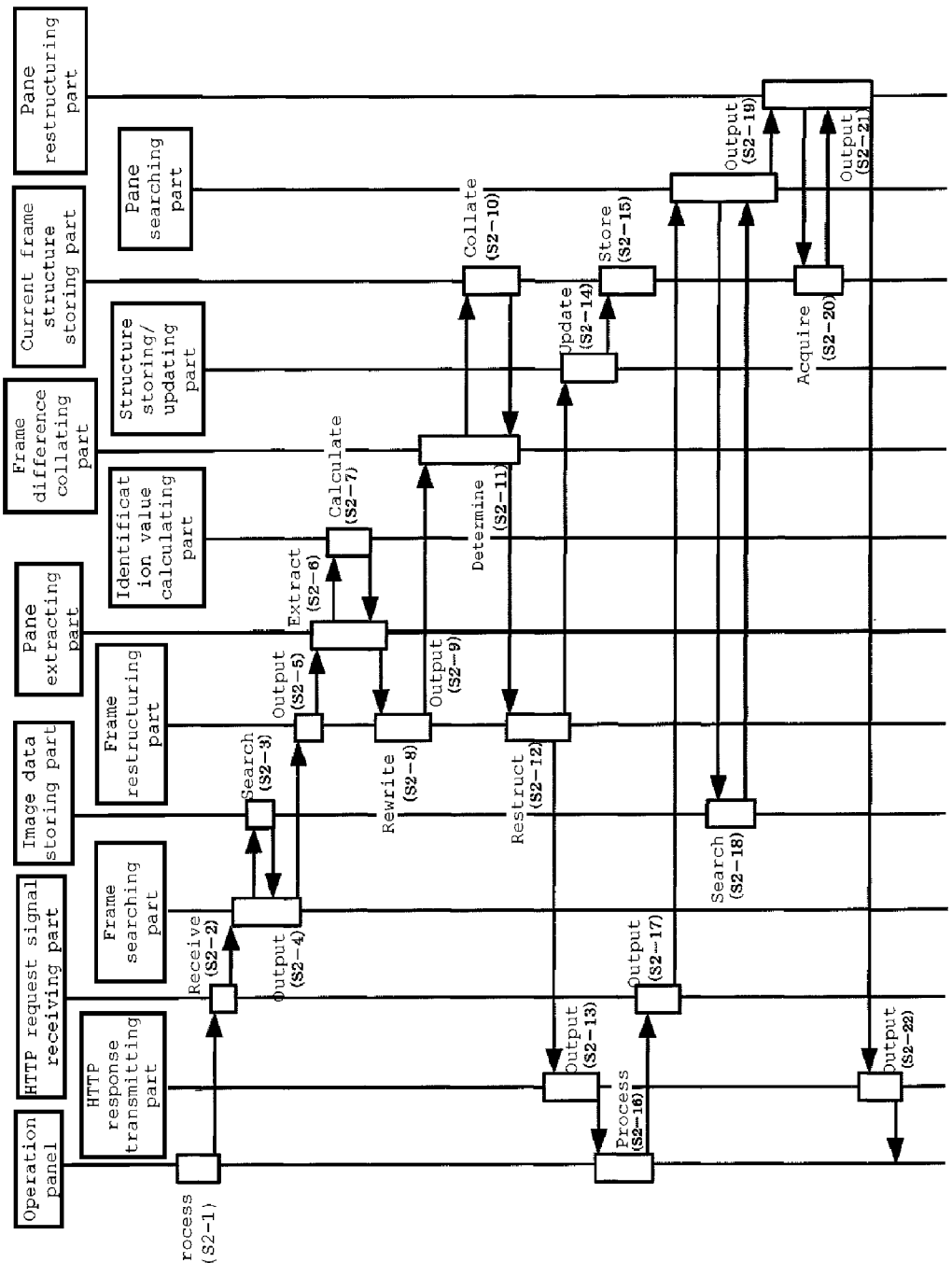
FIG. 12 shows a sequence of operations performed on a side of the controller section in the electric appliance according to the embodiment of the present invention.

FIG. 11 shows a flowchart concerning the operation panel section 1 and FIG. 12 that shows a flowchart concerning the controller section 2. Next, a description will be given of operations of the electric appliance K according to this embodiment.

It is assumed herein that the electric appliance K is turned on in such a manner that the user operates the operation panel section 1 (S1-1), so that the display panel 100 displays the graphical image 30 shown in FIG. 5A as an initial screen. In this case, the following operations are performed in sequence.

The operation panel section 1 issues a request to acquire the frame data 50 with the source name "frame01" through the HTTP request generating part 1002 (S1-2).

The operation panel section 1 executes the process (S2-1), so that the HTTP request receiving part 2002 of the controller section 2 receives a signal indicating the request to acquire the frame data 50 with the source name "frame01" from the operation panel section 1 (S2-2). Then, the HTTP request receiving part 2002 outputs the signal to the frame searching part 120.

The frame searching part 120 retrieves the frame data 50 with the source name "frame01" in the image data storing part 110 (S2-3), and then outputs the frame data 50 to the frame restructuring part 190 (S2-4).

The frame restructuring part 190 outputs the frame data 50 with the source name "frame01" to the pane extracting part 191 (S2-5). The pane extracting part 191 extracts the specific information (the value "src") from the frame data 50 with the source name "frame01" (S2-6), and then allows the unique identification value calculating part 192 to calculate the unique identification value of the specific information (S2-7).

The frame restructuring part 190 receives the unique identification value of the specific information from the pane extracting part 191 (S2-8). As shown in FIG. 13, then, the frame restructuring part 190 rewrites the value "src" of the specific information of the frame data 50 with the source name "frame01" to the unique identification value added with the identifier "hash/".

That is, the frame restructuring part 190 rewrites the values "src" of the specific information of the frame data 50 with the source name "frame01" from "main" to "hash/0x3c2d", from "submenu" to "hash/0x09c8", and from "content" to "hash/0x68da", respectively, to prepare frame data 50a (S2-8).

The frame restructuring part 190 outputs the frame data 50a with the source name "frame01" to the frame difference collating part 193 (S2-9).

The frame difference collating part 193 collates the frame data 50a with the source name "frame01" with frame data stored in the current frame structure storing part 160 (S2-10).

In this case, the current frame structure storing part 160 stores no frame data; therefore, there is no specific information equal to the specific information of the frame data 50a (S2-11).

The frame restructuring part 190 receives a result of the collation from the frame difference collating part 193 (S2-12). Then, the frame restructuring part 190 outputs the frame data 50 with the source name "frame01" as it is to the operation panel section 1 through the HTTP response transmitting part 2003 (S2-13).

Moreover, the frame restructuring part 190 outputs the frame data 50a with the source name "frame01" to the structure storing/updating part 194 (S2-14), and allows the current frame structure storing part 160 to store the frame data 50a (S2-15).

The controller section 2 executes the process (S1-3), so that the HTTP response receiving part 1003 of the operation panel section 1 receives the frame data 50 with the source name "frame01" and outputs the frame data 50 to the frame analyzing part 200 (S1-4).

The frame analyzing part 200 analyzes the frame data 50 with the source name "frame01" (S1-5).

Herein, since the specific information contains no identifier "hash/", the frame analyzing part 200 allows the pane requesting part 103 to issue a request to acquire the pane data 60 with the source name "main", the pane data 60 with the source name "submenu" and the pane data 60 with the source name "content" corresponding to the respective pieces of specific information (S1-6).

The pane requesting part 130 outputs a signal indicating the request to acquire the pane data 60 to the controller section 2 through the HTTP request generating part 1002 (S1-7).

In the controller section 2, the HTTP request receiving part 2002 receives the pane data request signal outputted by execution of the process (S2-16) in the operation panel section 1 (S2-17). The HTTP request receiving part 2002 outputs the pane data request signal to the pane searching part 131.

The pane searching part 131 retrieves pane data corresponding to the requested specific information in the image data storing part 110 (S2-18).

The pane searching part 131 retrieves the pane data with the source name "main", the pane data with the source name "submenu" and the pane data with the source name "content", and then outputs these pieces of pane data to the pane restructuring part 132 (S2-19).

The pane restructuring part 132 refers to the current frame structure storing part 160 to acquire unique identification values (main: hush/0x3c2d, submenu: hash/0x09c8, content: hash/0x68da) of specific information corresponding to the respective pieces of pane data.

Then, the pane restructuring part 132 adds the unique identification value to the pane data in such a manner that the unique identification value is embedded into the header of the pane data (S2-20).

Moreover, the pane restructuring part 132 outputs these pieces of pane data to the operation panel section 1 through the HTTP response transmitting part 2003 (S2-21, S2-22).

In the operation panel section 1, the HTTP response receiving part 1003 accepts the pane data outputted by execution of the process (S1-8) in the controller section 2 (S1-9), and the pane receiving part 133 receives the pane data (S1-10).

The pane receiving part 133 outputs the pane data to the pane image generating part 140.

The pane image generating part 140 generates pane images based on the pane data (S1-11), and then allows the pane image storing part 170 to store the pane images (S1-12).

Herein, the pane image generating part 140 creates the management table 171 for the pane images stored in the pane image storing part 170.

The frame analyzing part 200 outputs the frame data 50 with the source name "frame01" to the graphical image generating part 150. The graphical image generating part 150 receives the frame data from the frame analyzing part 200 (S1-13). Then, the graphical image generating part 150 reads the pane images of the pane data corresponding to the specific information of the frame data, from the pane image storing part 170 with the use of the management table 171 (S1-14).

Moreover, the graphical image generating part 150 forms the frames 40 from the frame data. In the respective frames 40, further, the graphical image generating part 150 arranges the pane image of the pane data with the source name "main" in the pane 31, the pane image of the pane data with the source name "submenu" in the pane 32, and the pane image of the pane data with the source name "content" in the pane 33, respectively, to generate the graphical image. Then, the graphical image generating part 150 allows the display panel 100 to display the graphical image generated as described above (S1-15, FIG. 5A).

In the electric appliance K, next, the display panel 100 displays the graphical image 30a corresponding to the frame data 55 with the source name "frame02" (FIG. 5B) through the user's operation in the following manner.

In order to display the graphical image corresponding to the frame data 55 with the source name "frame02" on the display panel 100 through the user's operation, first, the user operating part 1001 issues a request to acquire the frame data 55 with the source name "frame02" through the HTTP request generating part 1002 (S1-2).

In the controller section 2, the HTTP request receiving part 2002 receives a signal indicating the request to acquire the frame data 55 with the source name "frame02" outputted by execution of the process (S2-1) in the operation panel section 1 (S2-2), and outputs this signal to the frame searching part 120.

The frame searching part 120 retrieves the frame data 55 with the source name "frame02" in the image data storing part 110 (S2-3), and then outputs the frame data 55 to the frame restructuring part 190 (S2-4).

The frame restructuring part 190 outputs the frame data 55 with the source name "frame02" to the pane extracting part 191 (S2-5). The pane extracting part 191 extracts the specific information (the value "src") from the frame data 55 with the source name "frame02" (S2-6). Then, the pane extracting part 191 allows the unique identification value calculating part 192 to calculate the unique identification value of the specific information (S2-7).

As shown in FIG. 14, the frame restructuring part 190 receives the unique identification value of the specific information from the pane extracting part 191, and then rewrites the value of the specific information of the frame data 55 with the source name "frame02" to the unique identification value added with the identifier "hash/" (S2-8).

That is, the frame restructuring part 190 rewrites the values "src" of the specific information of the frame data 55 with the source name "frame02" from "main" to "hash/0x3c2d", from "submenu" to "hash/0x09c8", from "upperpane" to "hash/0x114a", and from "bottompane" to "hash/0x9b62", respectively, to prepare frame data 55a.

Then, the frame restructuring part 190 outputs the frame data 55a with the source name "frame02" to the frame difference collating part 193 (S2-9).

The frame difference collating part 193 collates the frame data 55a with the source name "frame02" with the frame data (e.g., the frame data 50a) stored in the current frame structure storing part 160, and then outputs a result of the collation to the frame restructuring part 190 (S2-10).

In this case, the current frame structure storing part 160 stores the frame data 50a with the source name "frame01"; therefore, the frame difference collating part 193 determines that the frame data 55a is equal in specific information having the values "src" of "hash/0x3c2d" and "hash/0x09c8" to the frame data 50a, but is different in specific information having the values "src" of "hash/0x114a" and "hash/0x9b62" from the frame data 50a (S2-11).

In the current frame structure storing part 160, the values of the specific information of the frame data 50a with the source name "frame01" and the values of the specific information of the frame data 55a with the source name "frame02" are rewritten to the unique identification values, respectively. Herein, the unique identification values are smaller in data length than the values of the specific information. Therefore, the colleting process by the frame difference collating part 193 can be simplified.

The frame restructuring part 190 receives the collation result from the frame difference collating part 193. In the frame data 55a with the source name "frame02", then, the frame restructuring part 190 leaves the specific information having the values "src" equal to those of the frame data 50a with the source name "frame01" as they are, respectively, and changes the specific information having the values "src" different from those of the frame data 50a with the source name "frame01" to the original values, respectively.

That is, the frame restructuring part 190 rewrites the values "src" of the specific information of the frame data 55 with the source name "frame02" from "main" to "hash/0x3c2d", and from "submenu" to "hash/0x09c8", and leaves the values "src" of "upperpane" and "bottompane" as they are to prepare frame data 55b with the source name "frame02" (S2-12).

Then, the frame restructuring part 190 outputs the frame data 55b with the source name "frame02" to the operation panel section 1 through the HTTP response transmitting part 2003 (S2-13).

Moreover, the frame restructuring part 190 outputs the frame data 55a with the source name "frame02" to the structure storing/updating part 194 (S2-14). Then, the frame restructuring part 190 allows the current frame structure storing part 160 to store the frame data 55a (S2-15).

In the operation panel section 1, the HTTP response receiving part 1003 receives the frame data 55b with the source name "frame02" outputted by execution of the process (S1-3) in the controller section 2 (S1-4).

Upon reception of the frame data 55b with the source name "frame02", the HTTP response receiving part 1003 outputs the frame data 55b to the frame analyzing part 200.

The frame analyzing part 200 analyzes the frame data 55b with the source name "frame02" (S1-5).

The frame analyzing part 200 neglects the specific information having the values "src" added with the identifier "hash/" ("hash/0x3c2d", "hash/0x09c8").

Moreover, the frame analyzing part 200 allows the pane requesting part 130 to issues a request to acquire the pane data with the source name "upperpane" and the pane data with the source name "bottompane" corresponding to the specific information having the values "src" added with no identifier "hash/" (S1-6).

Further, the frame analyzing part 200 outputs the frame data 55b with the source name "frame02" to the graphical image generating part 150.

The pane requesting part 130 outputs a signal indicating the request to acquire the pane data with the source name "upperpane" and the pane data with the source name "bottompane" to the controller section 2 through the HTTP request generating part 1002 (S1-7).

In the controller section 2, the HTTP request receiving part 2002 receives the signal indicating the request to acquire the pane data with the source name "upperpane" and the pane data with the source name "bottompane" outputted by execution of the process (S2-16) in the operation panel section 1 (S2-17).

The HTTP request receiving part 2002 outputs the pane data request signal to the pane searching part 131.

The pane searching part 131 retrieves the pane data with the source name "upperpane" and the pane data with the source name "bottompane" in the image data storing part 110 (S2-18).

The pane searching part 131 outputs the pane data with the source name "upperpane" and the pane data with the source name "bottompane" to the pane restructuring part 132 (S2-19).

The pane restructuring part 132 refers to the current frame structure storing part 160 to acquire the unique identification values "src" ("hash/0x114a", "hash/0x9b62") of the specification information corresponding to the pane data, and then adds the unique identification value to the pane data (S2-20).

Moreover, the pane restructuring part 132 outputs the pane data to the operation panel section 1 through the HTTP response transmitting part 2003 (S2-21, S2-22).

In the operation panel section 1, the HTTP response receiving part 1003 receives the pane data outputted by execution of the process (S1-8) in the controller section 2 (S1-9), and then outputs the pane data to the pane receiving part 133 (S1-10).

The pane receiving part 130 outputs the pane data to the pane image generating part 140.

The pane image generating part 140 generates the pane images based on the pane data (S1-11), and then allows the pane image storing part 170 to store the pane images (S1-12).

Herein, the pane image generating part 140 creates the management table 171 for the pane images stored in the pane image storing part 170.

The graphical image generating part 150 receives the frame data from the frame analyzing part 200 (S1-13). Then, the graphical image generating part 150 reads, from the pane image storing part 170, the pane images of the pane data corresponding to the specific information of the frame data with the use of the management table 171 (S1-14).

Moreover, the graphical image generating part 150 forms the frames 40 based on the frame data. In the frames 40, further, the graphical image generating part 150 arranges the pane image of the pane data with the value "src" of "hash/0x3c2d (main)" in the pane 31, the pane image of the pane data with the value "src" of "hash/0x09c8 (submenu)" in the pane 32, the pane image of the pane data with the value "src" of "upperpane" in the pane 34, and the pane image of the pane data with the value "src" of "bottompane" in the pane 35, respectively, to generate the graphical image.

Then, the graphical image generating part 150 allows the display panel 100 to display the graphical image 30a based on the graphical image generated as described above (S1-15, FIG. 5B).

With this configuration, burdens of executing the processes to be imposed on the browser on the panel side can be reduced remarkably in comparison with a case where all screens are interpreted and rendered like conventional browser processing.

In this case, the graphical image generating part 150 arranges the pane image with the value "src" of "main" and the pane image with the value "src" of "submenu", which have been already stored in the pane image generating part 140, in the pane 31 and the pane 32, respectively. Therefore, the pane image generating part 140 does not necessarily generate pane images for each acquisition of frame data.

Moreover, the frame analyzing part 200 allows the respective parts to execute processes on the basis of a fact whether the value "src" of the specific information is added with the identifier "hash/". Thus, burdens of executing the processes to be imposed on the operation panel section 1 can be reduced.

That is, the processes for display of a graphical image are executed in the operating panel section 1 while the processes for comparison of specific information and calculation of unique identification values are executed in the controller section 2. As a result, the processes to be executed by the microprocessors in the operation panel section 1 can be relatively simplified. Thus, burdens of executing the processes to be imposed on the operation panel section 1 can be shared.

This configuration allows improvement of response upon display of a graphical image on the display panel 100.

In the electric appliance K, as shown in FIGS. 5B and 5C, it is assumed herein that the graphical image 30a displayed on the display panel 100 is switched to the graphical image 30b by the user's operation through the user operating part 1001. In this case, the frame analyzing part 200 allows the pane requesting part 130 to issue the request to acquire pane data for forming pane images to be arranged in the panes 36 to 38 to the controller section 2, as in the foregoing manner.

Then, the pane image generating part 140 generates the pane images from the pane data sent from the controller section 2, and then allows the pane image storing part 170 to newly store the pane images.

The frame analyzing part 200 also allows the graphical image generating part 150 to read the frame data.

Then, the graphical image generating part 150 reads, from the pane image storing part 170, the pane images to be arranged in the panes 31, 36, 37 and 38 corresponding to the specific information of the frame data, and allows the display panel 100 to display the graphical image 30b.

As described above, the electric appliance K according to this embodiment can offer the following advantage. That is, the display control unit 18 compares the frame data stored in the frame data storage unit 16 with the frame data used for subsequent display and stored in the data storage unit 11 to allow the pane data acquisition unit 13 to select and acquire the pane data.

On the basis of the comparison described above, the display control unit 18 allows the graphical image generation unit 15 to select and acquire the pane images used for the display on the display unit 10 and stored in the pane image storage unit 17, without allowing the pane image generation unit 14 to generate new pane images.

Thus, the electric appliance K can simplify acquisition of the pane data by the pane data acquisition unit 13 and generation of the pane images by the pane image generation unit 14.

Moreover, the pane data selection unit 20 allows the pane data acquisition unit 13 to acquire the pane data corresponding to the specific information determined different by the specific information determination unit 19. In addition, the pane image selection unit 21 allows the graphical image generation unit 15 to acquire, from the pane image storage unit 17, the pane images of the pane data corresponding to the specific information determined equal by the specific information determination unit 19.

Therefore, when the graphical image displayed currently on the display unit 10 is switched to the subsequent graphical, the electric appliance K can acquire the pane data specified by the frame data of the displayed graphical image and the pane data specified by the frame data of the graphical image to be displayed subsequently, without overlaps.

Moreover, the pane image generation unit 14 generates the pane images from the pane data read newly and, therefore, does not necessarily generate the pane images of the displayed graphical image.

As a result, the pane image generation unit 14 can readily generate the pane images, so that the graphical image generation unit 15 can readily generate the graphical image.

Thus, the electric appliance K can improve response upon display of a graphical image on the display unit 10.

In this embodiment, the HTTP request generating part 1002, the HTTP response receiving part 1003, the frame analyzing part 200, the pane requesting part 130, the pane receiving part 133 and the pane image generating part 140 may be provided in an intermediate processing section (not shown) independently of the operation panel section 1, that is, may be provided as a subsystem.

With this configuration, the operation panel section 1 can serve as a platform that executes minimum performance as a browser. Moreover, when the intermediate processing section is disposed on the controller section 2, burden share of the processes can be changed.

The apparatus according to the present invention has been described on the basis of the preferred embodiment, but is not limited thereto. It is needless to say that the apparatus according to the present invention can be modified variously within the scope of the present invention.

In the foregoing embodiment, the electric appliance K has the configuration that the operation panel section 1 and the controller section 2 are connected to each other through the internal bus 3; however, the present invention is not limited thereto. For example, the operation panel section 1 may be a terminal such as a computer, a PDA or a portable telephone. Further, the controller section 2 may be an image forming apparatus such as a printer or a common home-use appliance such as a TV set or a refrigerator. In addition, the internal bus 3 may be a network such as a LAN.

In the foregoing embodiment, moreover, the operation panel section 1 and the controller section 2 are provided separately from each other; however, the present invention is not limited thereto. For example, the operation panel section 1 and the controller section 2 may be provided while being integrated into one piece.

A numerical relation between the operation panel section 1 and the controller section 2 may be a one-to-plural relation (specify the counterpart with the use of an address or an identifier) as long as one-to-one correspondence is established. Therefore, the number of the operation panel section 1 or the controller section 2 may be changed appropriately.

In the foregoing embodiment, the unique identification value calculating part 192 serving as the unique identification value calculation unit calculates a hash value as a unique identification value with the use of a hash function; however, the present invention is not limited thereto. For example, the unique identification value calculating part 192 may acquire a unique identification value with the use of a data table in which a predetermined unique identification value is correlated with specific information. Alternatively, the unique identification value calculating part 192 may acquire a unique identification value from header information of frame data.

The present invention is summarized as follows on the basis of the foregoing embodiment. That is, according to one aspect of the present invention, there is provided an electric appliance. The electric appliance comprises a display unit, a data storage unit, a frame data acquisition unit, a pane data acquisition unit, a pane image generation unit, a graphical image generation unit, a frame data storage unit, a pane image storage unit and a display control unit. The display unit allows frame display; a data storage unit that stores frame data for forming frames and pane data for generating pane images to be displayed in the frames. The frame data acquisition unit acquires frame data from the data storage unit. The pane data acquisition unit acquires, from the data storage unit, pane data specified by specific information of the frame data acquired by the frame data acquisition unit. The pane image generation unit generates pane images from the pane data acquired by the pane data acquisition unit. The graphical image generation unit forms frames based on the frame data acquired by the frame data acquisition unit, arranges the pane images generated by the pane image generation unit in the frames, generates a graphical image thereby, and allows the display unit to display the graphical image. The frame data storage unit stores the frame data used for the display on the display unit. The pane image storage unit that stores the pane images used for the display on the display unit. And the display control unit, when the frame data acquisition unit acquires frame data to be used for subsequent display on the display unit, compares the frame data acquired by the frame data acquisition unit with the frame data stored in the frame data storage unit to select one of pane data to be acquired by the pane data acquisition unit and pane images to be acquired by the graphical image generation unit from the pane image storage unit.

In the electric appliance according to this configuration, when the graphical image displayed originally on the display unit is switched to the subsequent graphical image by the user's operation, the frame data acquisition unit acquires the frame data for the subsequent display.

Herein, the display control unit compares the frame data acquired by the frame data acquisition unit with the frame data of the graphical image displayed on the display unit. On the basis of this comparison, the display control unit allows the pane data acquisition unit to select and acquire the pane data and allows the graphical image generation unit to select and acquire the pane images.

With this configuration, the electric appliance can simplify acquisition of the pane data by the pane data acquisition unit and generation of the pane images by the pane image generation unit.

Therefore, the electric appliance can simplify generation of a graphical image by the graphical image generation unit and improve response upon display of the graphical image on the display unit.

Preferably, the display control unit may include a specific information determination unit, a pane data selection unit and a pane image selection unit. The specific information determination unit determines whether specific information of the frame data to be used for the subsequent display, acquired by the frame data acquisition unit, is equal to the specific information of the frame data stored in the frame data storage unit. The pane data selection unit allows the pane data acquisition unit to acquire pane data corresponding to the specific information determined different by the specific information determination unit. And the pane image selection unit allows the graphical image generation unit to acquire, from the pane image storage unit, pane images of pane data corresponding to the specific information determined equal by the specific information determination unit.

With this configuration, at the time when the graphical image displayed currently on the display unit is switched to the subsequent graphical image, the pane data acquisition unit can acquire the pane data specified by the frame data of the displayed graphical image and the pane data specified by the frame data of the graphical image to be displayed subsequently, without overlaps.

Moreover, the pane image generation unit generates the pane images from the pane data read newly and, therefore, does not necessarily generate the pane images for the displayed graphical image.

As a result, the pane image generation unit can readily generate the pane images, so that the graphical image generation unit can readily generate the graphical image.

Thus, the electric appliance can improve response upon display of the graphical image on the display unit.

Also preferably, the display control unit may include a unique identification value calculation unit that calculates a unique identification value of the specific information. And the specific information determination unit determines whether the specific information of the frame data to be used for the subsequent display is equal to the specific information of the frame data stored in the frame data storage unit on the basis of a comparison between unique identification values of the two pieces of specific information. Herein, the unique identification values are calculated by the unique identification value calculation unit.

In the electric appliance, the specific information determination unit determines whether the two pieces of specific information are equal to or different from each other, with the use of the unique identification values having a predetermined length. Herein, even when the specific information is redundant, the specific information determination unit uses the unique identification value having the small data length and, therefore, can readily make such a determination of comparison.

Also preferably, the unique identification value calculation unit may calculate a hash value as the unique identification value of the specific information.

With this configuration, the unique identification value calculation unit can calculate the unique identification value of the specific information with the use of a hash function.

Also preferably, the specific information determination unit may include an identifier addition unit that adds a predetermined identifier to the specific information on the basis of the determination by the specific information determination unit. Herein, the pane data selection unit selects pane data to be acquired by the pane data acquisition unit in accordance with presence/absence of the specific information to which the identifier is added by the identifier addition unit. And the pane image selection unit selects pane images to be acquired by the graphical image generation unit in accordance with presence/absence of the specific information to which the identifier is added by the identifier addition unit.

With this configuration, the pane data selection unit allows the pane data acquisition unit to select and acquire the pane data with the use of the frame data outputted from the specific information determination unit. Moreover, the pane image selection unit allows the graphical image generation unit to select and acquire the pane image with the use of the frame data outputted from the specific information determination unit.

According to another aspect of the present invention, there is provided a image display controlling method of an electric appliance. The display controlling method includes the steps of: (a) acquiring frame data from a data storage unit of the electric appliance, the data storage unit being configured to store frame data for forming frames and pane data for generating pane images to be displayed in the frames; (b) acquiring pane data specified by specific information of the acquired frame data, from the data storage unit; (c) generating pane images from the acquired pane data; forming frames based on the acquired frame data, arranging the generated pane images in the formed frames to generate a graphical image, and allowing a display unit to display the generated graphical image; (d) when acquiring, from the data storage unit, frame data to be used for subsequent display on the display unit, comparing the frame data to be used for subsequent display with the frame data used for the display on the display unit to select and acquire one of pane data to be used for subsequent display and the pane images used for the display on the display unit; and (e) generating a graphical image from the frame data and the selected one of the pane data and the pane images each acquired newly to allow the display unit to display the graphical image.

The display controlling method can readily generate the graphical image to be displayed on the display unit of the electric appliance, without limitations concerning the configuration of the electric appliance.

According to still another aspect of the present invention, and referring now to FIG. 16, there is provided a computer-readable recording medium 1600 (such as, but not limited to, a volatile or non-volatile storage medium for storing an image display controlling program that is configured to carry out one or more of the described steps, actions, and/or functionality set forth herein. By one approach, this image display controlling program allows a computer of an electric appliance to function as a display unit, a data storage unit, a frame data acquisition unit, a pane data acquisition unit, a pane image generation unit, a graphical image generation unit, a frame data storage unit, a pane image storage unit and a display control unit. The display unit allows frame display. The data storage unit stores frame data for forming frames and pane data for generating pane images to be displayed in the frames. The frame data acquisition unit acquires frame data from the data storage unit. The pane data acquisition unit acquires, from the data storage unit, pane data specified by specific information of the frame data acquired by the frame data acquisition unit. The pane image generation unit generates pane images from the pane data acquired by the pane data acquisition unit. The graphical image generation unit forms frames based on the frame data acquired by the frame data acquisition unit, arranges the pane images generated by the pane image generation unit in the frames, generates a graphical image thereby, and allows the display unit to display the graphical image. The frame data storage unit stores the frame data used for the display on the display unit. The pane image storage unit stores the pane images used for the display on the display unit. And the display control unit, when the frame data acquisition unit acquires frame data to be used for subsequent display on the display unit, compares the frame data acquired by the frame data acquisition unit with the frame data stored in the frame data storage unit to select one of pane data to be acquired by the pane data acquisition unit and pane images to be acquired by the graphical image generation unit from the pane image storage unit.

The program described above may be installed on a universal terminal such as a computer.

The terminal having the program installed thereon can readily generate the graphical image to be displayed on the display unit of the electric appliance.

According to yet another aspect of the present invention, an electric appliance comprises a display, a first memory, a second memory, a display control unit. The display is configured to display graphical images that are based upon frame data and pane images. The first memory has used frame data stored therein. The second memory has used pane images stored therein. The display control unit is operably coupled to the display, the first memory, and the second memory and is configured to compare subsequent frame data with the used frame data in order to automatically select between using: pane data is specified by specific information contained within the subsequent frame data; and the used pane images; when preparing a subsequent graphical image to display on the display.

In the electric appliance, the image display controlling method, and the computer-readable recording medium storing the image display controlling program according to the respective aspects of the present invention, the display control unit compares the frame data acquired by the frame data acquisition unit with the frame data of the graphical image displayed on the display unit. On the basis of this comparison, the display control unit allows the pane data acquisition unit to select and acquire the pane data and allows the graphical image generation unit to select and acquire the pane image. Therefore, the electric appliance, the image display controlling method, and the computer-readable recording medium storing the image display controlling program according to the respective aspects of the present invention can simplify generation of the graphical image by the graphical image generation unit and improve response upon display of the graphical image on the display unit.

The image display controlling program is partially or entirely provided while being stored in a magnetic disc, an optical disc, a semiconductor memory or an optional computer-readable recording medium. The program is red from the recording medium, and is executed while being installed on a computer.

What is claimed is:

1. An electric appliance comprising:
a display unit that allows frame display;
a data storage unit for storing frame data for forming frames and pane data for generating pane images to be displayed in the frames;
a frame data acquisition unit for acquiring frame data from the data storage unit;
a pane data acquisition unit for acquiring, from the data storage unit, pane data specified by specific information of the frame data acquired by the frame data acquisition unit;
a pane image generation unit for generating pane images from the pane data acquired by the pane data acquisition unit;
a graphical image generation unit for forming frames based on the frame data acquired by the frame data acquisition unit, arranging the pane images generated by the pane image generation unit in the frames, generating a graphical image thereby, and allowing the display unit to display the graphical image;
a frame data storage unit for storing the frame data used for the display on the display unit;
a pane image storage unit for storing the pane images used for the display on the display unit; and
a display control unit that, when the frame data acquisition unit acquires frame data to be used for subsequent display on the display unit, compares the frame data acquired by the frame data acquisition unit with the frame data stored in the frame data storage unit to select one of pane data to be acquired by the pane data acquisition unit and pane images to be acquired by the graphical image generation unit from the pane image storage unit;
wherein the display control unit includes:
a specific information determination unit for determining whether specific information of the frame data to be used for the subsequent display is equal to the specific information of the frame data stored in the frame data storage unit;
a pane data selection unit for allowing the pane data acquisition unit to acquire pane data corresponding to the specific information of the frame data for use in the subsequent display when said specific information is determined to be different from the specific information of the frame data stored in the frame data storage unit by the specific information determination unit;
a pane image selection unit for allowing the graphical image generation unit to acquire, from the pane image storage unit, pane images of pane data corresponding to the specific information of the frame data stored in the frame data storage unit when the specific information of the frame data for use in the subsequent display is determined to be equal to the specific information of the frame data stored in the frame data storage unit by the specific information determination unit;
a unique identification value calculation unit that calculates a unique identification value of the specific information;
wherein the specific information determination unit determines whether the specific information of the frame data to be used for the subsequent display is equal to the specific information of the frame data stored in the frame data storage unit on the basis of a comparison between unique identification values of the two pieces of specific information, the unique identification values being calculated by the unique identification value calculation unit; and
the unique identification value calculation unit calculates a hash value as the unique identification value of the specific information.

2. The electric appliance according to claim 1, wherein
the specific information determination unit includes an identifier addition unit that adds a predetermined identifier to the specific information on the basis of the determination by the specific information determination unit,
the pane data selection unit selects pane data to be acquired by the pane data acquisition unit in accordance with presence/absence of the specific information to which the identifier is added by the identifier addition unit, and
the pane image selection unit selects pane images to be acquired by the graphical image generation unit in accordance with presence/absence of the specific information to which the identifier is added by the identifier addition unit.

3. An image display controlling method of an electric appliance, comprising the steps of:
acquiring frame data from a data storage unit of the electric appliance, the data storage unit being configured to store frame data for forming frames and pane data for generating pane images to be displayed in the frames;
acquiring pane data specified by specific information of the acquired frame data, from the data storage unit;
generating pane images from the acquired pane data;
forming frames based on the acquired frame data, arranging the generated pane images in the formed frames to generate a graphical image, and allowing a display unit to display the generated graphical image;
when acquiring, from the data storage unit, frame data to be used for subsequent display on the display unit, comparing the frame data to be used for subsequent display with the frame data used for the display on the display unit to select and acquire one of pane data to be used for subsequent display and the pane images used for the display on the display unit; and generating a graphical image from the frame data and the selected one of the pane data and the pane images each acquired newly to allow the display unit to display the graphical image;

wherein comparing the frame data to be used for display comprises:

determining whether specific information of the acquired frame data to be used for subsequent display is equal to the specific information of the frame data used for the display on the display unit; and selecting and acquiring one of the pane data to be used for subsequent display and the pane images used for display on the display unit comprises one of:

acquiring pane data to be used for subsequent display corresponding to the specific information of the frame data to be used for the subsequent display when said specific information is determined to be different from the specific information of the frame data used for display on the display unit by the determining step;

acquiring pane images used for the display of pane data corresponding to the specific information of the frame data used for the display on the display unit when the specific information of the frame data to be used for subsequent display is determined to be equal to the specific information of the frame data used for display on the display unit by the determining step;

calculating a unique identification value of the specific information;

determining whether the specific information of the frame data to be used for subsequent display is equal to the specific information of the frame data to be used for display on the display unit on the basis of a comparison between unique identification values; and calculating a hash value as the unique identification value of the specific information.

4. A computer-readable storage device for storing an image display controlling program that allows a computer of an electric appliance to function as:

a display unit that allows frame display;

a data storage unit for storing frame data for forming frames and pane data for generating pane images to be displayed in the frames;

a frame data acquisition unit for acquiring frame data from the data storage unit;

a pane data acquisition unit for acquiring, from the data storage unit, pane data specified by specific information of the frame data acquired by the frame data acquisition unit;

a pane image generation unit for generating pane images from the pane data acquired by the pane data acquisition unit;

a graphical image generation unit for forming frames based on the frame data acquired by the frame data acquisition unit, arranging the pane images generated by the pane image generation unit in the frames, generating a graphical image thereby, and allowing the display unit to display the graphical image;

a frame data storage unit for storing the frame data used for the display on the display unit;

a pane image storage unit for storing the pane images used for the display on the display unit; and a display control unit that, when the frame data acquisition unit acquires frame data to be used for subsequent display on the display unit, compares the frame data acquired by the frame data acquisition unit with the frame data stored in the frame data storage unit to select one of pane data to be acquired by the pane data acquisition unit and pane images to be acquired by the graphical image generation unit from the pane image storage unit;

wherein the image display controlling program allows the display control unit to function as:

a specific information determination unit for determining whether specific information of the frame data to be used for the subsequent display, acquired by the frame data acquisition unit, is equal to the specific information of the frame data stored in the frame data storage unit;

a pane data selection unit for allowing the pane data acquisition unit to acquire pane data corresponding to the specific information of the frame data for use in the subsequent display when said specific information is determined to be different from the specific information of the frame data stored in the frame data storage unit by the specific information determination unit; and a pane image selection unit for allowing the graphical image generation unit to acquire, from the pane image storage unit, pane images of pane data corresponding to the specific information of the frame data stored in the frame data storage unit when the specific information of the frame data for use in the subsequent display is determined to be equal to the specific information of the frame data stored in the frame data storage unit by the specific information determination unit;

a unique identification value calculation unit that calculates a unique identification value of the specific information;

wherein the specific information determination unit determines whether the specific information of the frame data to be used for the subsequent display is equal to the specific information of the frame data stored in the frame data storage unit on the basis of a comparison between unique identification values of the two pieces of specific information, the unique identification values being calculated by the unique identification value calculation unit; and the unique identification value calculation unit calculates a hash value as the unique identification value of the specific information.

* * * * *